Figure 1:
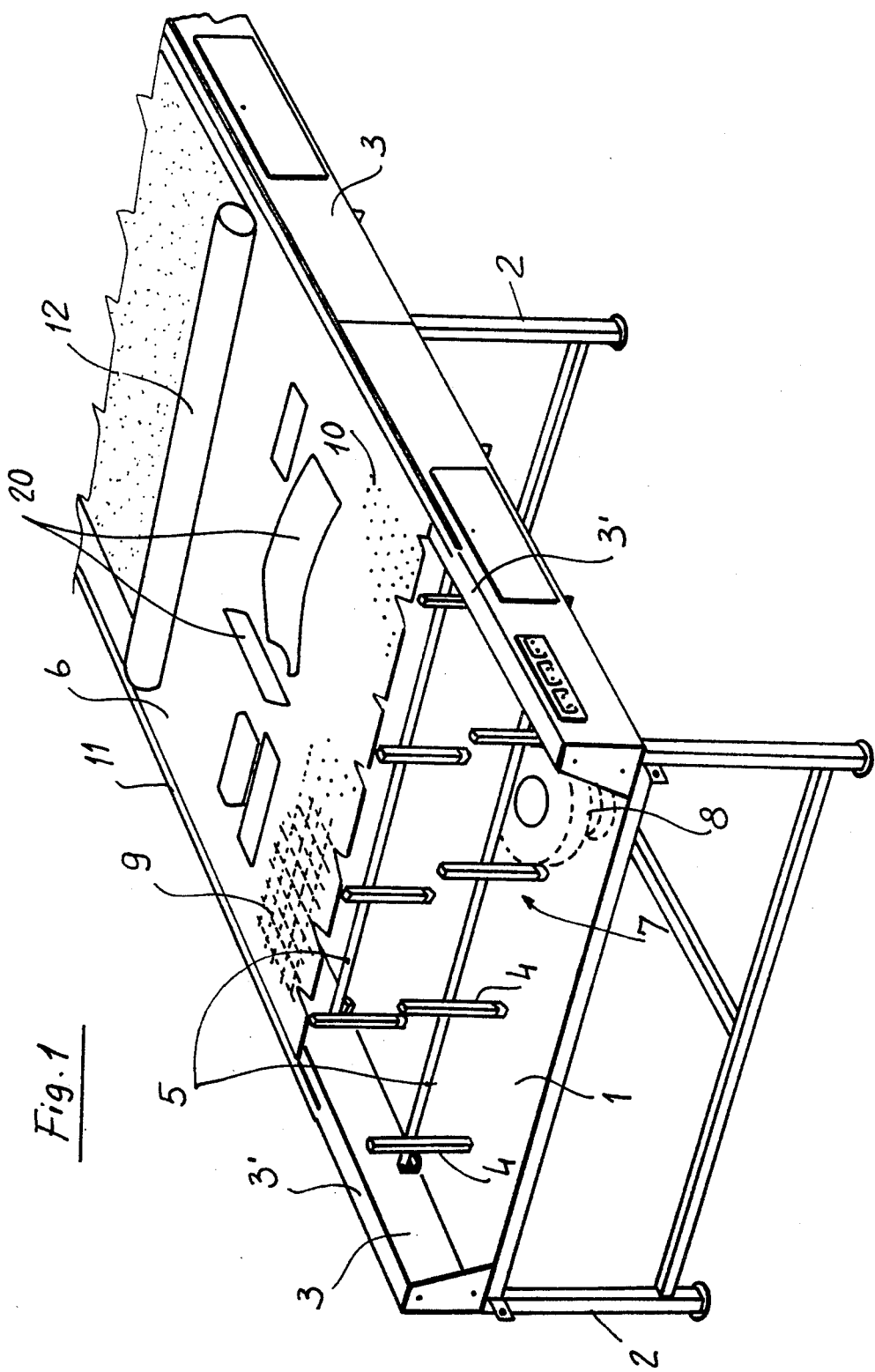

United States Patent [19]

Giachetti

[11] Patent Number: 4,580,893
[45] Date of Patent: Apr. 8, 1986

[54] EQUIPPED TABLE FOR MAKING MARKED OFF SHEETS REPRODUCING THE OUTLINE OF THE TEMPLATES OF A MODEL USED IN THE TEXTILE CLOTH ARTICLE FIELD

[76] Inventor: Franco Giachetti, Via Gardale, 25036 - Palazzolo sull'Oglio (Brescia), Italy

[21] Appl. No.: 540,650

[22] Filed: Oct. 11, 1983

[30] Foreign Application Priority Data

Oct. 27, 1982 [IT] Italy ............................. 23957 A/82

[51] Int. Cl.⁴ ..................... G03B 27/30; G03B 27/20
[52] U.S. Cl. ..................................... 355/100; 355/73; 355/76; 355/91
[58] Field of Search ..................... 355/100, 91, 73, 76, 355/77, 79, 87

[56] References Cited

U.S. PATENT DOCUMENTS

| | | | |
|---|---|---|---|
| 2,993,824 | 7/1961 | Richaudeau | 355/77 |
| 3,512,487 | 5/1970 | Kranz et al. | 355/76 |
| 3,592,538 | 7/1971 | Ukai | 355/73 |
| 3,762,815 | 10/1973 | Friedel | 355/76 |
| 3,834,813 | 9/1974 | White | 355/77 |

Primary Examiner—Monroe H. Hayes
Attorney, Agent, or Firm—Bucknam and Archer

[57] ABSTRACT

There is disclosed an equipped table for making marked off sheets reproducing the outline of the templates or stencils of a model as used in the textile cloth article field.

The table essentially comprises a horizontal transparent bearing surface or plate, provided with a plurality of small through holes, thereunder there is formed a closed gap, coupled to a sucking device and including a number of illuminating lamps.

At one end of the mentioned surface, moreover, there is located a development chamber, including ammonia heatable tanks and provided with a system for forcibly circulating air in the inside thereof.

Thus a plurality of marked off sheets may be made by a single template arrangement, the made sheets being perfectly dry and devoid of any odors.

2 Claims, 2 Drawing Figures

EQUIPPED TABLE FOR MAKING MARKED OFF SHEETS REPRODUCING THE OUTLINE OF THE TEMPLATES OF A MODEL USED IN THE TEXTILE CLOTH ARTICLE FIELD

The present invention relates to an equipped table for preparing the so-called "profiled sheets", that is paper sheets which provide the outlines for reproducing the several parts of a pattern or model, as used in the textile cloth industry.

It is well known when clothes or fabric articles are industrially made, a fabric cutting operation is carried out comprising a tentering step for forming the so-called "mattress", a marking off step and a cutting step proper.

More specifically, the above mentioned marking off step conventionally consists of marking, on a first layer of the mattress, the cut outline, by means of cardboard stencils and chalks for marking off the outline.

Presently, for eliminating the time wasted during of the manual marking off operation, said operation is replaced by the use of marked sheets, produced by heliographic printing, and glued on the first layer of the mattress.

However the apparatus presently used, for making the mentioned marked off sheets, are affected by some drawbacks.

More specifically the known marking off apparatus is comprised of a table, of suitable size, whereon sensitized paper material is arranged. Cardboard stencils or templates are then arranged on said paper material, in such a way as to reduce to a minimum the fabric waste, said stencils (which may also be made of light metals) reproducing the several parts or pieces of the cloth article to be cut and made.

Then the sensible paper material is suitably exposed through an illuminating source and developed, by a dry method, in ammonia vapors.

To this end, it should be pointed out that the stencils are merely caused to rest on the sensitized paper material and accordingly, if said stencils or templates are not perfectly flat, they may reproduce deformed profiles on said paper material.

Moreover, to locate the exposed paper material in the development chamber, it is necessary to remove from said paper material all of the stencils arranged thereon.

That requirement, as it will be clear, involves a further step of rearranging on said sensitized paper material all of the removed stencils or templates.

Finally, even if it would be possible to mark off paper material by means of copying apparatus, it should be noted that such an operation is a very difficult one, because of the great linear size of said marked off paper material.

The fact is to be further considered that, by using the known apparatus for making marked off sheets, causes the obtained marked sheets to be impregnated by ammonia vapors which may be objectionable to the operators.

Accordingly, the task of the present invention is to overcome the above mentioned drawbacks by providing such an equipped table, for making marked off paper sheets for use in the textile cloth article field, which affords the possibility of making a plurality of marked off sheets from a single arrangement of the stencils or templates.

Within that task, it is a primary object of the present invention to provide such an equipped table, for making marked off paper sheets for use in the textile cloth article field, which is effective to assure a perfect fitting of the templates to be reproduced to the profiles formed on said paper sheets.

Another object of the present invention is to provide such an equipped table, for making marked off paper sheets for use in the textile cloth article field, which is effective to afford the possibility of making developed sheets devoid of any objectionable odors.

According to one aspect of the present invention, the above task and objects, as well as yet other objects which will become more apparent hereinafter, are achieved by an equipped table, for making marked off sheets effective to be used in the textile cloth field, characterized in that it comprises a transparent horizontally extending bearing surface, provided with a plurality of through holes, a closed gap formed under said bearing surface and coupled to a sucking device, in said closed gap a plurality of lamps being arranged, and a development chamber arranged at one end of said bearing surface and including a plurality of ammonia tanks effective to be heated, said chamber being moreover provided with a system for forcibly circulating air in the inside thereof.

Figure 2:
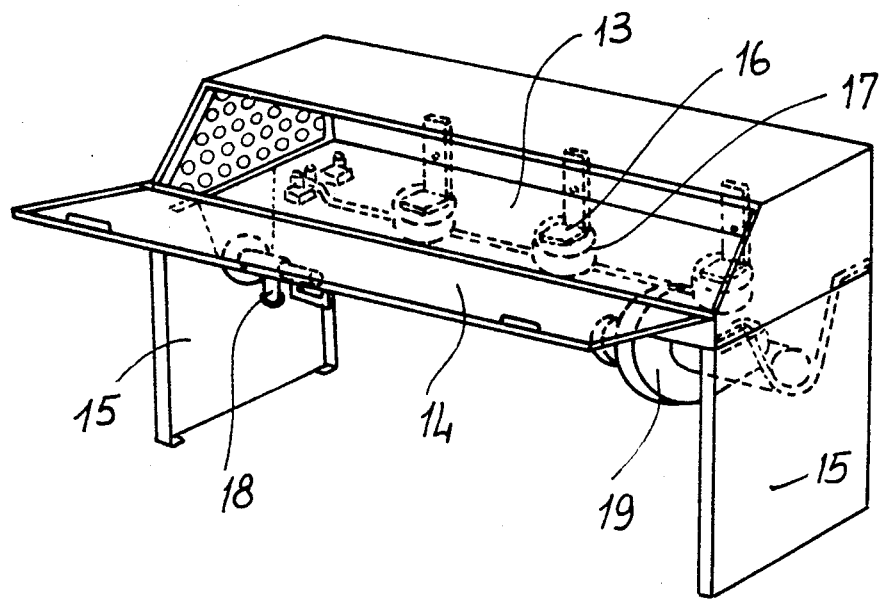

Further characteristics and advantages of the equipped table according to the present invention will become more apparent hereinafter from the following detailed description of a preferred embodiment thereof, being illustrated by way of an indicative example in the accompanying drawings, where:

FIG. 1 is a broken away view, partially in perspective, of the equipped table according to the invention; and FIG. 2 is a perspective view illustrating the development chamber arranged at one end of the table.

With reference to the figures of the accompanying drawings, the equipped table for making marked off sheets for use in the textile cloth article field according to the present invention, comprises a first horizontally extending surface 1, of suitable size, which is supported, at a predetermined height, by leg pairs 2.

The mentioned horizontally extending surface is provided with perimetrical shoulders 3, upturned at the top at 3', and supports a plurality of uprights or vertical posts 4, arranged in a parallel equispaced relationship, among which there are arranged a plurality of illuminating lamps 5.

On the mentioned shoulders there is arranged a transparent material plate 6, forming a second horizontally extending surface and defining, in cooperation with the first mentioned horizontally extending surface 1 and said shoulders 7 a tight gap 7.

More specifically, that gap communicates with at least a sucking device aspirator 8, whereas the mentioned transparent plate 6 is provided with an engraved grid pattern 9, at the cross points whereof there are formed corresponding through holes 10.

Moreover on the two shoulders 3 which delimit the first horizontally extending surface there are arranged guiding members 11, which are is effective to slide a carriage (not shown) for properly laying sensitized paper material 12, usually provided in roll form.

At one end of the thus constructed structure there is provided a development chamber 13, of suitable size, provided with a tiltable door 14 and mounted on sidewalls 15 of a suitable height.

The mentioned development chamber comprises, in the inside thereof, a plurality of ammonia tanks 16, said tanks including a plurality of heating electric resistances 17.

That same development chamber, moreover, communicates to the outside through a suitable air inlet duct 18, preferably arranged at said tiltable door, and through the discharging port of an aspirator 19.

In actual practice, after having arranged the stencils or templates 20 on the transparent plate 6, a reduced pressure is generated inside said gap 7, thereby affixing said templates to the plate.

Then on the transparent plate the sensitized paper material is arranged and the illuminating lamps are energized for a predetermined period of time.

Then the exposed paper material is wound up and located in the development chamber.

In this connection, it should be pointed out that the reduced pressure generated in the gap 7 is held at such a value as to hold firmly engaged the templates 20 on the plate 6, while affording the possibility of easily removing the exposed paper material which, on the other hand, is subjected to a sucking effect only through a small number of the holes formed through said transparent plate.

Moreover, since the templates are firmly engaged on the transparent plate, it is possible to easily make, from a single arrangement of said templates, a plurality of marked off sheets.

The provision of an aspirator in the development chamber affords the possibility of generating, after having suitably processed the exposed paper material by ammonia vapors, a suitable fresh air circulation in the inside of said development chamber.

Since the circulating air substantially subjects the marked paper material to a washing out effect, the marked paper material may be easily removed from the development chamber in a dry condition free of any objectionable odors.

From the above disclosure and the figures of the accompanying drawings will be self.evident the great functionality and use facility which characterize the equipped table for making marked off.sheets effective to be used in the textile cloth article field according to the present invention.

While a preferred embodiment of the subject equipped table has been hereinabove illustrated and disclosed, it should be noted that the disclosed embodiment is susceptible to many modifications and variations all of which fall within the spirit and scope of the invention, as defined in the accompanying claims.

I claim:

1. A table for making marked off sheets for use in the textile field and for making a plurality of marked off sheets from a single arrangement of the stencils, which comprises a first horizontal plate (1), legs (2) supporting said plate, said plate having a perimetrical shoulder (3), a second horizontal transparent plate (6) disposed on said perimetrical shoulder, a gap being formed by said two horizontal plates (1) and (6), a plurality of vertical posts (4) supported by said first horizontal plate, a plurality of lamps placed in said gap, suction means connected with said gap, said second transparent plate having an engraved grid (9) and a plurality of through-holes at the cross-points of the grid, the stencils being placed on said transparent plate during operation, said shoulder supporting a guide for a carriage, a roll of sensitized paper sliding on said carriage, a development chamber arranged at one end of said apparatus and means for circulating air in the interior of said chamber.

2. The apparatus according to claim 1 wherein said development chamber contains a plurality of ammonia tanks and a plurality of electric resistance elements in said tanks.

* * * * *